(12) United States Patent
Hesse et al.

(10) Patent No.: US 11,992,897 B2
(45) Date of Patent: May 28, 2024

(54) APPARATUS AND METHOD FOR LASER MACHINING A WORKPIECE

(71) Applicant: TRUMPF Laser-und Systemtechnik GmbH, Ditzingen (DE)

(72) Inventors: Tim Hesse, Ditzingen (DE); Daniel Flamm, Ludwigsburg (DE); Myriam Kaiser, Heimsheim (DE)

(73) Assignee: TRUMPF LASER-UND SYSTEMTECHNIK GMBH, Ditzingen (DE)

( * ) Notice: Subject to any disclaimer, the term of this patent is extended or adjusted under 35 U.S.C. 154(b) by 0 days.

(21) Appl. No.: 18/362,995

(22) Filed: Aug. 1, 2023

(65) Prior Publication Data

US 2024/0017352 A1 Jan. 18, 2024

Related U.S. Application Data

(63) Continuation of application No. PCT/EP2022/051529, filed on Jan. 25, 2022.

(30) Foreign Application Priority Data

Feb. 2, 2021 (DE) ...................... 10 2021 102 387.4

(51) Int. Cl.
  *B23K 26/067* (2006.01)
  *B23K 26/04* (2014.01)
(52) U.S. Cl.
  CPC ........ *B23K 26/0676* (2013.01); *B23K 26/043* (2013.01)
(58) Field of Classification Search
  CPC ........................... B23K 26/0676; B23K 26/043

USPC ..................................................... 219/121.85
See application file for complete search history.

(56) References Cited

U.S. PATENT DOCUMENTS

| 10,722,980 | B2 | 7/2020 | Tanaka et al. |
| 10,843,956 | B2* | 11/2020 | Liu ................... B23K 26/0617 |
| 2001/0035401 | A1 | 11/2001 | Manor |
| 2008/0135532 | A1 | 6/2008 | Hasaka et al. |

(Continued)

FOREIGN PATENT DOCUMENTS

| DE | 112012002487 T5 | 3/2014 |
| DE | 102016218865 A1 | 3/2017 |

(Continued)

*Primary Examiner* — Dana Ross
*Assistant Examiner* — Joseph W Iskra
(74) *Attorney, Agent, or Firm* — LEYDIG, VOIT & MAYER, LTD.

(57) ABSTRACT

An apparatus for laser machining a workpiece in a machining plane includes a first laser machining unit for forming a first focal zone which extends in a first main direction of extent, and at least one further laser machining unit for forming at least one further focal zone which extends in a further main direction of extent oriented transversely to the first main direction of extent. The first focal zone and the at least one further focal zone are spaced apart from one another parallel to the machining plane at a work distance. The first laser machining unit and the at least one further laser machining unit are movable in an advancement direction that is oriented parallel to the machining plane. The workpiece comprises a material that is transparent to a laser beam which respectively forms the first focal zone and the at least one further focal zone.

15 Claims, 11 Drawing Sheets

(56) References Cited

U.S. PATENT DOCUMENTS

| | | |
|---|---|---|
| 2010/0320178 A1 | 12/2010 | Kuester et al. |
| 2012/0223061 A1 | 9/2012 | Atsumi et al. |
| 2014/0102146 A1* | 4/2014 | Saito .................... C03B 33/093 65/112 |
| 2018/0111870 A1 | 4/2018 | Herrnberger et al. |
| 2019/0382300 A1* | 12/2019 | Bui ...................... B23K 26/032 |
| 2022/0258284 A1 | 8/2022 | Flamm et al. |

FOREIGN PATENT DOCUMENTS

| | | |
|---|---|---|
| DE | 102019217577 A1 | 5/2021 |
| WO | WO 2016077171 A2 | 5/2016 |
| WO | WO 2019197423 A1 | 10/2019 |
| WO | WO 2020254639 A1 | 12/2020 |

* cited by examiner

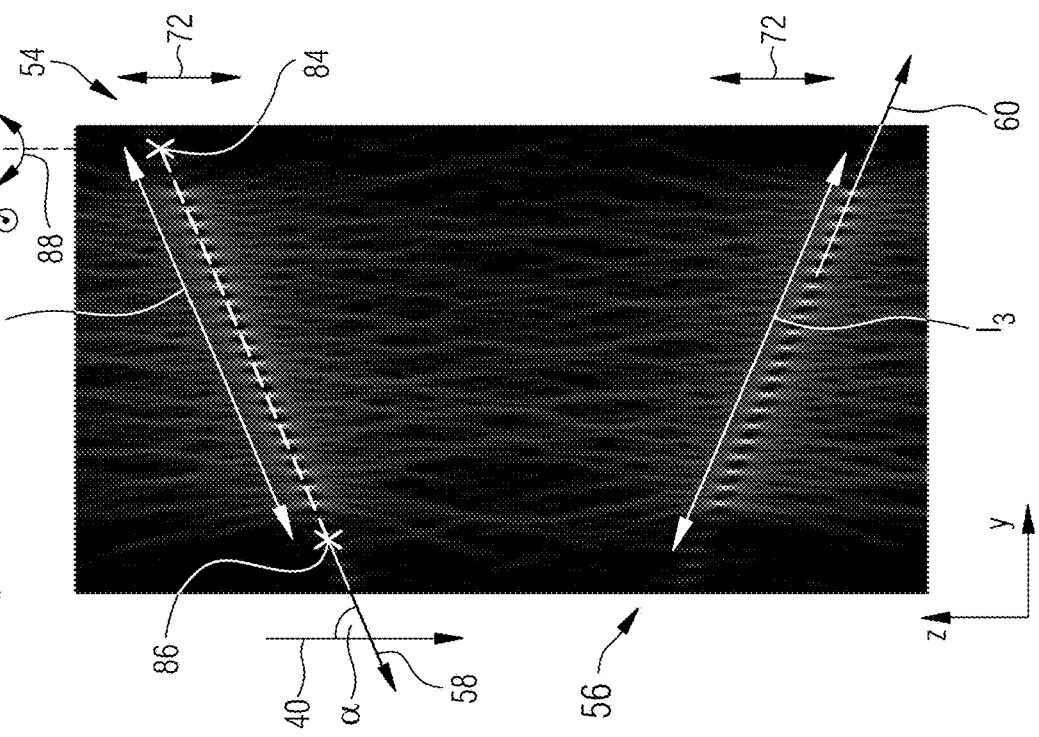

APPARATUS AND METHOD FOR LASER MACHINING A WORKPIECE

CROSS REFERENCE TO RELATED APPLICATIONS

This application is a continuation of International Application No. PCT/EP2022/051529 (WO 2022/167252 A1), filed on Jan. 25, 2022, and claims benefit to German Patent Application No. DE 10 2021 102 387.4, filed on Feb. 2, 2021. The aforementioned applications are hereby incorporated by reference herein.

FIELD

Embodiments of the present invention relate to an apparatus for laser machining a workpiece in a machining plane.

Embodiments of the present invention also relate to a method for laser machining a workpiece in a machining plane.

SUMMARY

Embodiments of the present invention provide an apparatus for laser machining a workpiece in a machining plane. The apparatus includes a first laser machining unit for forming a first focal zone which extends in a first main direction of extent, and at least one further laser machining unit for forming at least one further focal zone which extends in a further main direction of extent oriented transversely to the first main direction of extent. The first focal zone and the at least one further focal zone are spaced apart from one another parallel to the machining plane at a work distance. The first laser machining unit with the first focal zone and the at least one further laser machining unit with the at least one further focal zone are movable in an advancement direction that is oriented parallel to the machining plane. The workpiece comprises a material that is transparent to a laser beam which respectively forms the first focal zone and the at least one further focal zone.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 5a shows a cross-sectional illustration of a simulated intensity distribution of an example of a second focal zone and a third focal zone in a yz-plane oriented parallel to a respective main direction of extent of the second focal zone and third focal zone, respectively;

FIG. 5b shows a cross-sectional illustration of a simulated intensity distribution of an example of a second focal zone in a yz-plane oriented parallel to a main direction of extent of the second focal zone;

FIG. 5c shows a cross-sectional illustration of a simulated intensity distribution of an example of a third focal zone in a yz-plane oriented parallel to a main direction of extent of the third focal zone;

DETAILED DESCRIPTION

Figure 1:
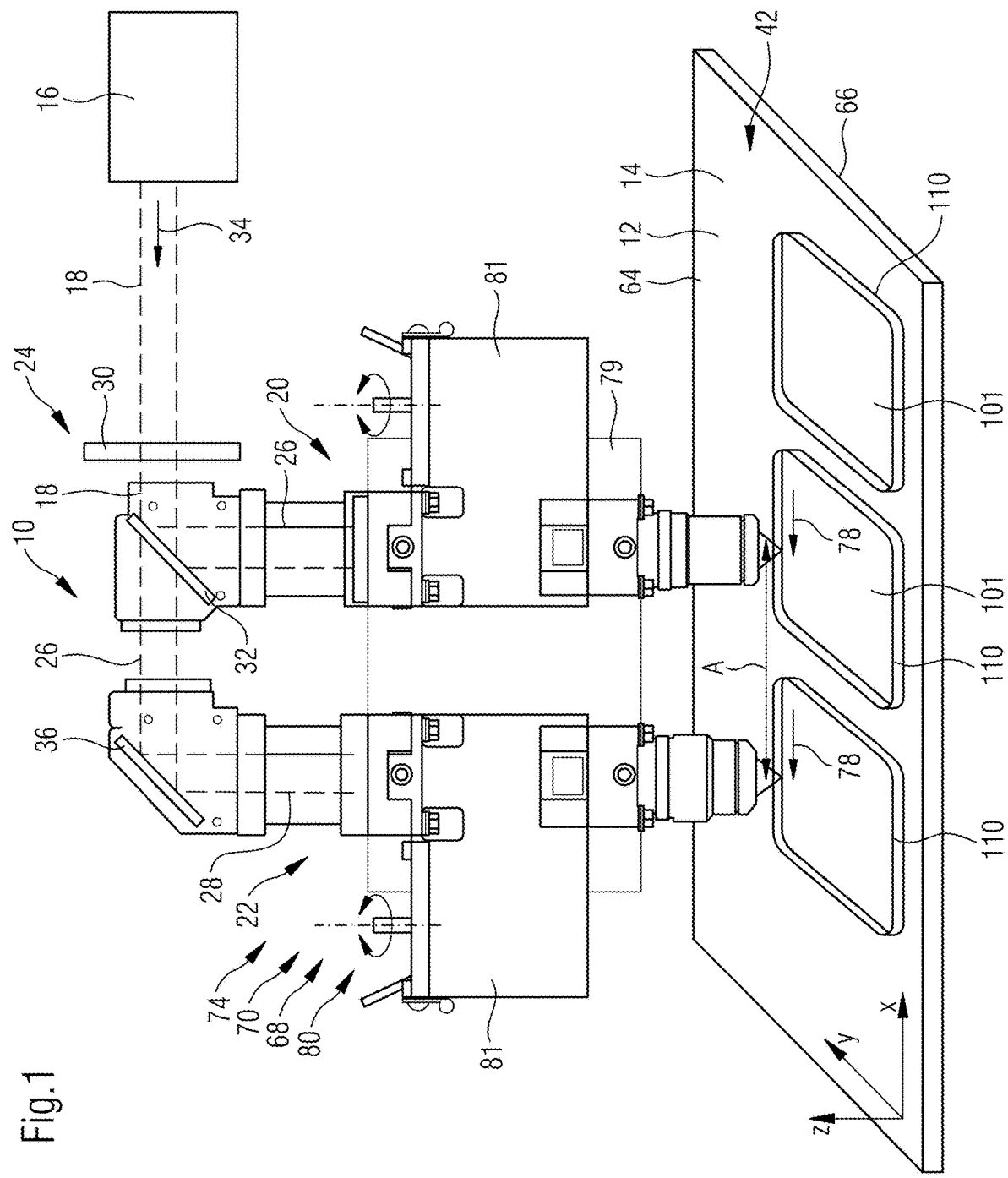
FIG. 1 shows a first exemplary embodiment of an apparatus for laser machining a workpiece, having a first laser machining unit and a second laser machining unit.

Embodiments of the present invention provide a method, by means of which it is possible to form a plurality of angled modification regions on a workpiece in a fewer number of work steps and/or within a shorter machining duration.

According to embodiments of the invention, the apparatus includes a first laser machining unit for forming a first focal zone which extends in a first main direction of extent and at least one further laser machining unit for forming at least one further focal zone which extends in a further main direction of extent oriented transversely to the first main direction of extent, the first focal zone and the at least one further focal zone being spaced apart from one another parallel to the machining plane at a work distance, the first laser machining unit with the first focal zone and the at least one further laser machining unit with the at least one further focal zone each being movable in an advancement direction that is oriented parallel to the machining plane, and the workpiece being produced from a material which is transparent to a laser beam which respectively forms the first focal zone and the at least one further focal zone.

Using the apparatus according to embodiments of the invention, it is possible at a machining point of the workpiece to generate a plurality of modification regions which are oriented transversely and, in particular, perpendicular to the machining plane and in which the material of the workpiece is separable in particular. By way of example, this allows the separation from the workpiece of workpiece segments which, in a separation region, have a plurality of separation faces oriented transversely and in particular perpendicular to the machining plane. In particular, these separation faces have a geometry which corresponds to the focal zones.

As a result of the first laser machining unit and the at least one further laser machining unit being spaced apart at a work distance, it is possible in particular to obtain quasi-simultaneous machining and/or time-offset machining of the workpiece using the first focal zone and the at least one further focal zone. In particular, the use of different apparatuses for forming material modifications along machining lines oriented transversely to one another is no longer necessary in that case.

By way of example, the work distance is greater than or equal to a length or a width of a workpiece segment to be separated from the workpiece, as measured in the machining plane.

In principle, a plurality of further focal zones may be provided, with, in that case, each further focal zone being assigned a further main direction of extent in particular.

In the present case, the at least one further laser machining unit should be understood to be a second laser machining unit and/or a third laser machining unit, for example. In the present case, the at least one further focal zone should be understood to be a second focal zone and/or a third focal zone, for example.

The first focal zone and the at least one further focal zone need not necessarily have a straight-line embodiment; instead, they may also have a curved shape, for example.

In particular, the main direction of extent of a focal zone should be understood to be a direction of a straight line extending through a start and end point of the focal zone.

By way of example, the work distance is at least 1 mm and/or at most 100 cm.

It may be advantageous if the first laser machining unit and the at least one further laser machining unit are arranged facing the same outer side of the workpiece. A technically simple structure of the apparatus, in particular, can be realized as a result.

It may be advantageous, for the same reason, if the first focal zone and the at least one further focal zone are coupled or couplable into the workpiece through the same outer side of the workpiece.

In particular, input coupling of the first focal zone and of the at least one further focal zone into the workpiece is implemented from the same direction.

In particular, laser machining of the workpiece in a machining plane should be understood to mean that the workpiece is machined parallel to and/or along the machining plane in the advancement direction. In particular, the first main direction of extent and/or the further main direction of extent are each oriented transversely or perpendicular to the machining plane.

In particular, material modifications which extend transversely or perpendicular to the machining plane, which is to say extend in particular with a directional component in the depth direction of the workpiece, are formed during the laser machining of the workpiece.

By way of example, the workpiece extends parallel to the machining plane.

By way of example, a length direction and/or a width direction of the workpiece are oriented parallel to the machining plane.

By way of example, a depth direction of the workpiece is oriented perpendicular to the machining plane.

By way of example, the first main direction of extent is oriented parallel or transversely to a depth direction of the workpiece.

By way of example, the machining plane is oriented parallel or at least approximately parallel to an outer side of the workpiece facing the first laser machining unit and/or the second laser machining unit.

By way of example, the first laser machining unit and the at least one further laser machining unit are arranged spaced apart from one another parallel to the machining plane.

By way of example, the first laser machining unit and the first focal zone and also the at least one further laser machining unit and the at least one further focal zone are movable relative to the workpiece in an advancement direction and/or relative to the workpiece in a manner parallel to the machining plane.

By way of example, the workpiece has a slab-like and/or extensive form.

It may be advantageous if the first laser machining unit and the at least one further laser machining unit are mechanically coupled and/or control-coupled to one another in such a way that a movement of, firstly, the first laser machining unit and the first focal zone and, secondly, the at least one further laser machining unit and the at least one further focal zone is implemented in a common advancement direction. As a result, it is possible to achieve simultaneous and/or time-offset machining of different spatial regions of the workpiece.

It may be advantageous, for the same reason, if the first laser machining unit and the at least one further laser machining unit are mechanically coupled and/or control-coupled to one another in such a way that a movement of, firstly, the first laser machining unit and the first focal zone and, secondly, the at least one further laser machining unit and at least one further focal zone is implemented along machining contours which are oriented parallel to one another and/or with a parallel offset from one another.

In particular, provision can be made for the apparatus to comprise a holding device on which the first laser machining unit and the at least one further laser machining unit are arranged, with the first laser machining unit with the first focal zone and the at least one further laser machining unit with the at least one further focal zone being movable in a common advancement direction by means of the holding device. As a result, mechanical coupling of the first laser machining unit and the at least one further laser machining unit can be achieved, for example in a technically simple way.

By way of example, the first laser machining unit and the at least one further laser machining unit each have a housing, by means of which the first laser machining unit and the at least one further laser machining unit are arranged on and/or fastened to the holding device.

By way of example, the further main direction of extent is oriented at an angle of at least 1° and/or at most 89° with respect to the first main direction of extent.

It may be advantageous if certain portions of the first focal zone and of the at least one further focal zone are arranged at the same positions in relation to a depth direction oriented perpendicular to the machining plane and/or if certain portions of the first focal zone and of the at least one further focal zone are arranged at different positions in relation to a depth direction oriented perpendicular to the machining plane. As a result, it is possible to generate material modifications, for example, along machining lines, oriented differently with respect to one another, at different depth portions of the workpiece.

By way of example, the first focal zone and the at least one further focal zone overlap in certain portions in relation to a depth direction oriented perpendicular to the machining plane.

By way of example, the first focal zone and the at least one further focal zone are adjacent to one another in relation to a depth direction oriented perpendicular to the machining plane. In particular, a smallest distance in the depth direction between the first focal zone and the at least one further focal zone is no more than 10% of a length of the first focal zone.

In particular, the first focal zone and the at least one further focal zone extend in a common plane, which is oriented perpendicular to the machining plane in particular.

It may be advantageous if the apparatus comprises a setting device for setting the work distance, oriented parallel to the machining plane, between the first focal zone and the at least one further focal zone and/or between the first laser machining unit and the at least one further laser machining unit, with in particular the work distance being settable parallel to a length direction parallel to the machining plane and parallel to a width direction parallel to the machining plane. As a result, it is possible in particular to set respective lengths of machining lines on the material of the workpiece. By way of example, it is possible to set a respective length of a machining line and/or separation line, created by means of the at least one further focal zone, in relation to a length of a machining line and/or separation line, created by means of the first focal zone, at a specific machining point of the workpiece.

Provision can be made for respectively different work distances to be settable between the first focal zone and the respective further focal zones.

In particular, the work distance/work distances is/are chosen so that a target geometry arises at a machining point and/or a separation region of the workpiece.

In particular, at least one of the following applies in the case of an (imaginary) displacement of the first focal zone in the direction of the at least one further focal zone by the work distance:
  all or at least 60% of the at least one further focal zone or all further focal zones extends on a specific side in relation to a plane in which the first focal zone is located;
  the first focal zone and the at least one further focal zone are adjacent to one another and/or overlap at least in certain portions;
  the first focal zone and the at least one further focal zone form a spatially contiguous region.

In particular, this yields spatially contiguous machining of the material of the workpiece in relation to the depth direction at a specific machining point.

It may be advantageous if the apparatus comprises a setting device for respectively setting a work position of the first focal zone and the at least one further focal zone in relation to a depth direction oriented perpendicular to the machining plane. By way of example, this allows the first focal zone and the at least one further focal zone to be adapted to the workpiece depth and/or workpiece thickness. Furthermore, this for example allows relative positioning of the first focal zone and the at least one further focal zone for the purpose of setting a target geometry parallel to the depth direction.

In particular, a respective work position of the first focal zone and of the at least one further focal zone is constant or at least approximately constant in relation to the depth direction when laser machining the workpiece.

It may be advantageous if the first focal zone formed by means of the first laser machining unit has a quasi-nondiffractive and/or a Bessel-like beam profile. As a result, a focal zone which is elongate parallel to the depth direction of the workpiece can be realized in a technically simple way.

Quasi-nondiffractive beams and/or Bessel-like beams should be understood in particular to mean beams for which a transverse intensity distribution is propagation invariant. The transverse intensity distribution is understood to mean, in particular, an intensity distribution in a cross-sectional plane oriented perpendicular to the main beam propagation direction. In particular, the transverse intensity distribution in a longitudinal direction and/or beam propagation direction of the beams is substantially constant in the case of quasi-nondiffractive beams and/or Bessel-like beams.

Provision can be made for the first focal zone to be formed by means of at least two quasi-nondiffractive beams and/or Bessel-like beams oriented parallel to one another. As a result, it is possible for example to form the first focal zone with an asymmetric beam cross section.

It may be advantageous if the first focal zone formed by means of the first laser machining unit is asymmetrical and in particular elliptical in a cross section parallel to the machining plane. As a result, it is possible, in particular, to control formation of cracks in a material of the workpiece when forming material modifications by means of the laser machining.

It may be advantageous if the apparatus has a setting device for rotating an alignment of a largest diameter of the cross section of the first focal zone in the machining plane, and in particular if the largest diameter is alignable, and is in particular automatically alignable, parallel to the advancement direction by means of the setting device. As a result, it is possible, in particular, to obtain a controlled alignment of cracks substantially parallel to the advancement direction during the laser machining of the material of the workpiece. In particular, this enables an optimized separation of the material.

By way of example, the largest diameter of the cross section of the first focal zone is rotated about an axis of rotation perpendicular to the machining plane.

It may be advantageous if the at least one further focal zone formed by means of the at least one further laser machining unit is formed by splitting a laser beam into a plurality of component beams, with the component beams each being focused in mutually adjacent partial regions of the at least one further focal zone. This makes it possible to realize a focal zone with a definable three-dimensional geometry in a technically simple way.

Then, provision can be made for the component beams to each have one of two different polarization states, with component beams with respectively different polarization states being focused in adjacent partial regions of the at least one further focal zone.

It may be advantageous if the apparatus comprises a setting device for rotating the first focal zone and/or the at least one further focal zone about an axis of rotation oriented transversely or perpendicular or parallel to the machining plane, and in particular if an alignment of the at least one further focal zone at a fixed angle with respect to the advancement direction is settable, and is in particular automatically settable, by means of the setting device. The axis of rotation is not necessarily located symmetrically with respect to the at least one further focal zone. By way of example, an alignment of the at least one further focal zone relative to the first focal zone for the purpose of machining the workpiece in different advancement directions can be set by means of this setting device.

In particular, the advancement direction is oriented perpendicular to the at least one further focal zone.

It may be advantageous if the apparatus has an input coupling device for input coupling an input laser beam into the first laser machining unit and into the at least one further laser machining unit, a split of the input laser beam into a first component beam for input coupling into the first laser machining unit and into at least one further component beam for input coupling into the at least one further laser machining unit being implemented by means of the input coupling device. By way of example, the apparatus may be operated using a single laser source as a result.

In particular, provision can be made for the input laser beam to be guided and/or input coupled by fiber optics at least in certain portions.

In principle, it is also possible to input couple in each case a laser beam from a separate laser source into the first laser machining unit and into the at least one further laser machining unit.

It may be advantageous if the input coupling device comprises a polarization beam splitter device for splitting the input laser beam into the first component beam and the at least one further component beam. This makes it possible to realize a split of the input laser beam in a technically simple way.

By way of example, a respective polarization of the first component beam and of the at least one further component beam is settable by means of the input coupling device.

By way of example, a respective intensity and/or a respective power of the first component beam and of the at least one further component beam is settable by means of the input coupling device.

In an embodiment, a second focal zone with a second main direction of extent and a third focal zone with a third main direction of extent are formed by means of the at least one further laser machining unit, with the second main direction of extent and the third main direction of extent each being oriented transversely to the first main direction of extent. For example, two further focal zones are formed in this embodiment, specifically a second focal zone and a third focal zone.

In particular, the second focal zone and the third focal zone are then arranged spaced apart from one another in relation to a depth direction oriented perpendicular to the machining plane and/or the first focal zone is arranged between the second focal zone and the third focal zone in relation to a depth direction oriented perpendicular to the machining plane.

In particular, provision can be made for the second focal zone and the third focal zone to each extend between an outer side of the workpiece and the first focal zone when the material of the workpiece is impinged in the depth direction.

In particular, the first focal zone extends between the second focal zone and the third focal zone and in particular completely between the second focal zone and the third focal zone in relation to the depth direction.

In particular, a combination of the first focal zone and the at least one further focal zone extends from a first outer side of the workpiece to a second outer side of the workpiece, which is spaced apart from the first outer side in the depth direction.

It may be advantageous if at least certain portions of the second focal zone and of the third focal zone are arranged at the same positions in relation to a length direction and/or width direction parallel to the machining plane. In particular, temporal machining of the material of the workpiece with the second focal zone and the third focal zone can be achieved as a result.

As an alternative thereto, provision can be made for the second focal zone and the third focal zone to be arranged spaced apart from one another in relation to a length direction and/or width direction parallel to the machining plane. By way of example, the first focal zone is arranged between the second and the third focal zone in that case. By way of example, time-offset machining of the material of the workpiece with the first focal zone, the second focal zone, and the third focal zone can be achieved as a result.

In an embodiment, the apparatus comprises a single first laser machining unit and/or a single further laser machining unit, with a second focal zone with a second main direction of extent and a third focal zone with a third main direction of extent being formed by means of the further laser machining unit in particular, the second main direction of extent and the third main direction of extent each being oriented transversely to the first main direction of extent, and at least certain portions of the second focal zone and the third focal zone being arranged at the same positions in relation to a length direction and/or width direction parallel to the machining plane. For example, two further focal zones are formed by means of the further laser machining unit in this embodiment, specifically a second focal zone and a third focal zone.

In particular, the second focal zone and the third focal zone overlap in the case of a projection onto the machining plane.

In an embodiment, the apparatus comprises a single first laser machining unit and/or a second laser machining unit and a third laser machining unit, with, in particular, a second focal zone being formed by means of the second laser machining unit and a third focal zone being formed by means of the third laser machining unit, the second focal zone and the third focal zone each being oriented transversely to the first focal zone, and the second focal zone and the third focal zone being arranged spaced apart from one another in relation to a length direction and/or width direction parallel to the machining plane. For example, two further laser machining units and two further focal zones are present in this embodiment.

Embodiments of the present invention provide a method for laser machining a workpiece, in which a first laser machining unit is used to form a first focal zone which extends in a first main direction of extent and at least one further laser machining unit is used to form at least one further focal zone which extends in a further main direction of extent oriented transversely to the first main direction of extent, the first focal zone and the at least one further focal zone being spaced apart from one another parallel to the machining plane at a work distance, the workpiece being exposed to the first focal zone and the at least one further focal zone, the first laser machining unit with the first focal zone and the at least one further laser machining unit with the at least one further focal zone each being moved relative to the workpiece in an advancement direction that is oriented parallel to the machining plane, and the workpiece being produced from a material which is transparent to a laser beam which respectively forms the first focal zone and the at least one further focal zone.

It may be advantageous if an exposure of a specific machining point on the workpiece to the first focal zone and to the at least one further focal zone is implemented with a time offset. By way of example, material modifications at a specific machining point along machining lines oriented transversely to the machining plane can as a result be created with a time offset to a machining line oriented perpendicular to the machining plane.

By way of example, a specific machining point on the workpiece is exposed first to the at least one further focal zone and then to the first focal zone, or vice versa.

It may be advantageous if the at least one further laser machining unit is used to form a second focal zone and a third focal zone which are each oriented transversely to the first focal zone, the second focal zone and the third focal zone being arranged spaced apart from one another in relation to a depth direction oriented perpendicular to the machining plane and/or the first focal zone being arranged between the second focal zone and the third focal zone in relation to a depth direction oriented perpendicular to the machining plane.

It may be advantageous if the workpiece is exposed simultaneously to the second focal zone and the third focal zone at a specific machining point and an exposure of the workpiece to the first focal zone at this machining point is implemented with a time offset to the exposure of the workpiece to the second focal zone and to the third focal zone.

By way of example, a numerical value of a time difference between an exposure of the workpiece to the first focal zone at a specific machining point and to the at least one further focal zone corresponds to a quotient of the work distance and the advancement speed (in the case of constant advancement speed and advancement direction).

In an embodiment, provision can be made for an exposure of the workpiece to the first focal zone, the second focal zone, and the third focal zone to be implemented with a time offset in each case, with, in particular, an exposure of the workpiece to the first focal zone being implemented in timed fashion between an exposure of the workpiece to the second focal zone and the third focal zone.

In particular, the apparatus according to embodiments of the invention and/or the method according to embodiments of the invention have one or more of the features set forth below.

In particular, a movement of the first laser machining unit in the advancement direction brings about a corresponding movement of the first focal distribution in the advancement direction.

In particular, a movement of the at least one further laser machining unit in the advancement direction brings about a corresponding movement of the at least one further focal distribution in the advancement direction.

By way of example, the first focal zone and/or the at least one further focal zone are each formed as a straight line and/or in elongate fashion and/or in line-like fashion and/or in drawn-out fashion.

In particular, the first focal zone and/or the at least one further focal zone each extend parallel to a straight line.

In particular, the first focal zone and the at least one further focal zone each form a spatially contiguous interaction region for laser machining the workpiece, with localized material modifications which enable a separation of the material in particular being able to be formed in the interaction region in particular by exposing a material of the workpiece to this interaction region. In principle, it is possible for the first focal zone and/or the at least one further focal zone to have zeros and/or interruptions, with in particular these zeros and/or interruptions being small in comparison with an (overall) length of the first focal zone and/or the at least one further focal zone.

In particular, material modifications are formed in the material of the workpiece along a machining line and/or machining surface assigned to the first focal zone and the at least one further focal zone by way of relative movement of the workpiece in relation to the first focal zone and the at least one further focal zone.

In particular, provision can be made for the workpiece to be separable or separated along a machining line and/or machining surface by forming material modifications by means of the first focal zone and the at least one further focal zone.

It may be advantageous if the material of the workpiece is separable or separated along the machining line and/or machining surface by applying thermal loading and/or mechanical stress and/or by etching by means of at least one wet-chemical solution. By way of example, etching is implemented in an ultrasound-assisted etch bath.

In particular, provision can be made for the input laser beam to be a pulsed laser beam or an ultrashort pulse laser beam. By way of example, the first focal zone and/or the at least one further focal zone are formed by means of a pulsed laser beam or ultrashort pulse laser beam.

Control electronics for spatially resolved pulse control, in particular comprising pulse on demand, may be provided to control a laser source for providing the input laser beam.

In particular, a workpiece mount for the workpiece, which in particular has a nonreflective and/or strongly scattering surface, is provided.

In particular, provision may be made for the apparatus to comprise a laser source for providing an input laser beam for input coupling into the first laser machining unit and into the at least one further laser machining unit, with in particular a pulsed laser beam or an ultrashort pulse laser beam being provided by means of the laser source.

For example, a wavelength of the input laser beam is at least 300 nm and/or at most 1500 nm. For example, the wavelength is 515 nm or 1030 nm.

In particular, the input laser beam has a mean power of at least 1 W to 1 kW. For example, the input laser beam comprises pulses with a pulse energy of at least 100 and/or at most 50 mJ. Provision can be made for the input laser beam to comprise individual pulses or bursts, with the bursts having 2 to 20 subpulses and in particular a time interval of approx. 20 ns.

A transparent material should be understood to mean in particular a material through which at least 70% and in particular at least 80% and in particular at least 90% of a laser energy of the first focal zone and/or the at least one further focal zone is transmitted.

For example, the material of the workpiece is or comprises a glass material.

To determine spatial dimensions of the first focal zone and/or the at least one further focal zone, for example a respective length and/or a respective diameter, the first focal zone and/or the at least one further focal zone is considered in a modified intensity distribution which only contains intensity values located above a specific intensity threshold. In this respect, the intensity threshold is selected, for example, such that values below this intensity threshold have such a low intensity that they are no longer relevant for interaction with the material for the purpose of forming material modifications. For example, the intensity threshold is 50% of a global intensity maximum of the actual intensity distribution. A length of the respective focal zone, or a diameter of the respective focal zone, should then be understood to mean a maximum length of extent and/or a length of maximum extent of the respective focal zone along a longitudinal center axis of the focal zone, or in a plane oriented perpendicular to the longitudinal center axis, taken on the basis of the modified intensity distribution.

The first focal zone and/or the at least one further focal zone should be understood to mean in each case a spatially contiguous region of intensities above the specified intensity threshold in particular, with this region being able to have interruptions with a spatial extent of no more than 10% and in particular no more than 5% of a maximum extent and/or a maximum length of the first focal zone and/or of the at least one further focal zone.

Such interruptions in the first focal zone and/or the at least one further focal zone for example arise by the formation thereof by splitting a laser beam into a plurality of component beams and focusing the component beams into mutually adjacent partial regions. For example, this results in an embodiment of the focal zone by a juxtaposition of mutually spaced-apart focused spots of light.

If there are intensity distributions present with larger interruptions than the ones specified hereinabove, then these should in particular be understood to be different focal zones.

In particular, the indications "approx." and "at least approximately" are to be understood in general to mean deviations of no more than 10%. Unless stated otherwise, the indications "approx." and "at least approximately" should be understood to mean in particular that an actual value and/or distance and/or angle deviates by no more than 10% from an ideal value and/or distance and/or angle.

Elements that are the same or have equivalent functions are denoted by the same reference signs in all the exemplary embodiments.

A first exemplary embodiment of an apparatus for laser machining a workpiece is shown in FIG. 1 and is denoted by 10 in that figure. The apparatus 10 can be used to create localized material modifications on a material 12 of a workpiece 14, such as for example defects on the submicron scale or on the atomic scale which weaken the material. At the material modifications created, the workpiece 14 can for example be separated into different workpiece segments or workpiece segments can for example be separated from the workpiece 14 in a subsequent step.

In particular, the apparatus 10 comprises a laser source 16 (indicated in FIG. 1) for providing an input laser beam 18. The input laser beam 18 is in particular a pulsed laser beam and/or an ultrashort pulse laser beam. For example, the input laser beam 18 is a Gaussian beam and/or has a diffractive beam profile.

In the exemplary embodiment in accordance with FIG. 1, the apparatus 10 comprises a first laser machining unit 20 and a second laser machining unit 22 arranged spaced apart from the first laser machining unit 20.

By way of example, the apparatus 10 comprises an input coupling device 24 for the purpose of input coupling the input laser beam 18 into the first laser machining unit 20 and into the second laser machining unit 22.

Using this input coupling device 24, the input laser beam 18 is split into a first component beam 26 for input coupling into the first laser machining unit 20 and into a second component beam 28 for input coupling into the second laser machining unit 22.

Alternatively, it would also be possible to input couple respectively different laser beams from mutually different laser sources into the first laser machining unit 20 and into the second laser machining unit 22. In this case, a separate laser source would for example be provided in each case for the first laser machining unit 20 and the second laser machining unit 22.

In the exemplary embodiment in accordance with FIG. 1, the input laser beam 18 is split by polarization beam splitting. The input coupling device 24 comprises a polarization element 30 for setting a polarization direction of the input laser beam 18. In particular, the polarization element 30 is or comprises a retardation plate, for example a half-wave or quarter-wave plate.

This polarization element 30 is arranged in the beam path of the input laser beam 18. After passing through the polarization element 30, the input laser beam for example has a linear polarization with a defined polarization direction. In principle, it is also possible for circularly or elliptically polarized light to be produced by means of the polarization element 30.

Further, the input coupling device 24 comprises a polarization beam splitting element 32 for splitting the input laser beam 18 into the first component beam 26 and the second component beam 28. In relation to a beam propagation direction 34 of the input laser beam 18, this polarization beam splitting element 32 is arranged downstream of the polarization element 30. By way of example, the polarization beam splitting element 32 is arranged at the first laser machining unit 20.

The polarization beam splitting element 32 is used to split the input laser beam 18 into the first component beam 26 and the second component beam 28 on the basis of its polarization direction. In particular, setting the polarization direction by means of the polarization element 30 allows an intensity of the first component beam 26 to be set in relation to the second component beam 28.

By way of example, the first component beam 26 is formed by partial reflection of the input laser beam 18 at the polarization beam splitting element 32 and deflected and/or input coupled into the first laser machining unit 20. By way of example, the second component beam 28 is formed by partial transmission of the input laser beam 18 and is passed through to the second laser machining unit 22.

In particular, a mirror element 36, for example arranged at the second laser machining unit 22, is provided for deflecting and/or input coupling the second component beam 28 into the second laser machining unit 22.

The first component beam 26 is imaged into a first focal zone 38 using the first laser machining unit 20, the first focal zone 38 (FIGS. 3a, 3b and 4a, 4b) having a quasi-nondiffractive and/or a Bessel-like beam profile. In particular, the first focal zone 38 is formed in elongate fashion and/or in drawn-out fashion and/or as a straight line.

In terms of the formation and properties of quasi-nondiffractive beams, reference is made to the book: "Structured Light Fields: Applications in Optical Trapping, Manipulation and Organisation", M. Wordemann, Springer Science & Business Media (2012), ISBN 978-3-642-29322-1, and in particular to Chapter 5: "Non-Diffracting Beams for the Three-Dimensional Moulding of Matter". Express reference to the entire content thereof is made.

By way of example, the first laser machining unit 20 comprises an axicon element (not shown) for the purpose of forming the first focal zone 38.

The first focal zone 38 has a first main direction of extent 40, in which the first focal zone 38 extends. In the example shown, this first main direction of extent 40 is oriented perpendicular to a machining plane 42 (indicated in FIG. 1), in which the workpiece 14 is machinable by means of the apparatus 10.

By way of example, the workpiece 14 has a slab-like form and extends parallel to the machining plane 42. In particular, a workpiece holder (not shown) is provided for the appropriate arrangement and/or fixation of the workpiece 14 on the apparatus 10.

By way of example, a length direction x and a width direction y of the workpiece 14 are oriented parallel to the machining plane 42 and a depth direction z of the workpiece 14 is oriented perpendicular to the machining plane 42. Consequently, the first main direction of extent 40 of the first focal zone 38 is oriented parallel to the depth direction z in the example shown.

Figure 3B:
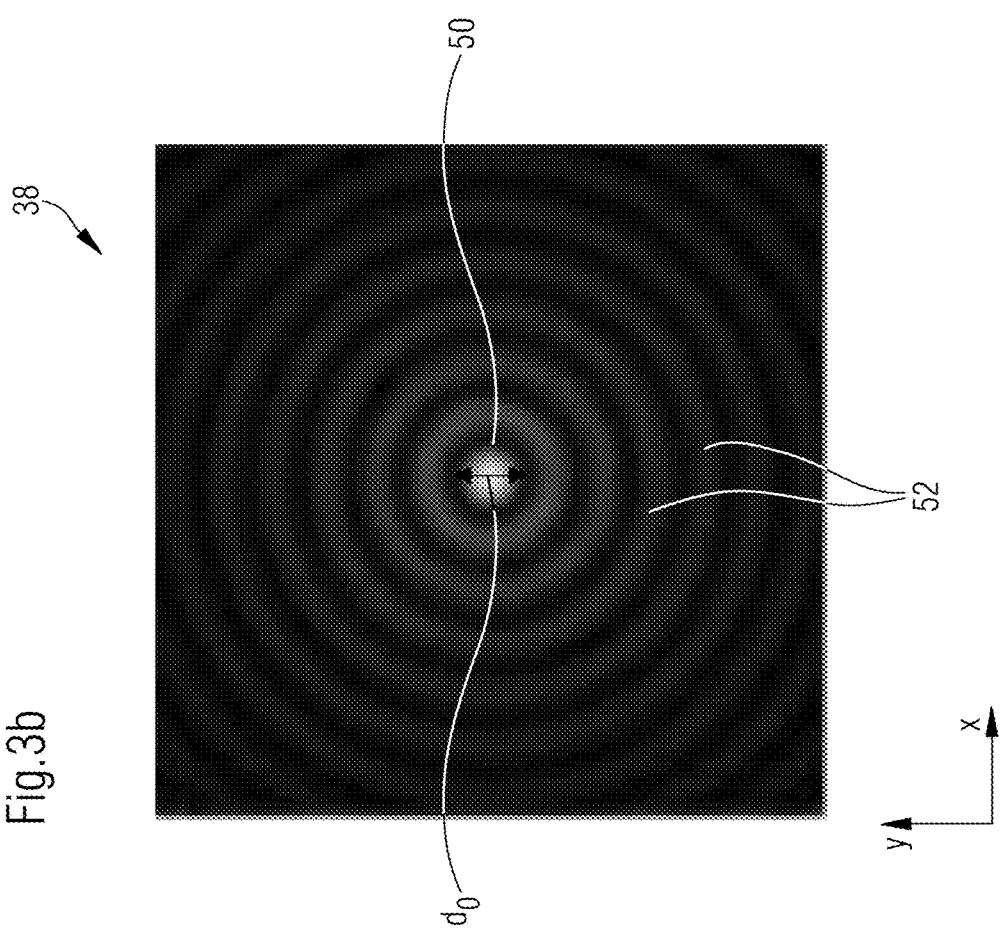
FIG. 3b shows a cross-sectional illustration of the intensity distribution of the first focal zone in accordance with FIG. 3a in an xy-plane oriented perpendicular to the main direction of extent.
Figure 3A:
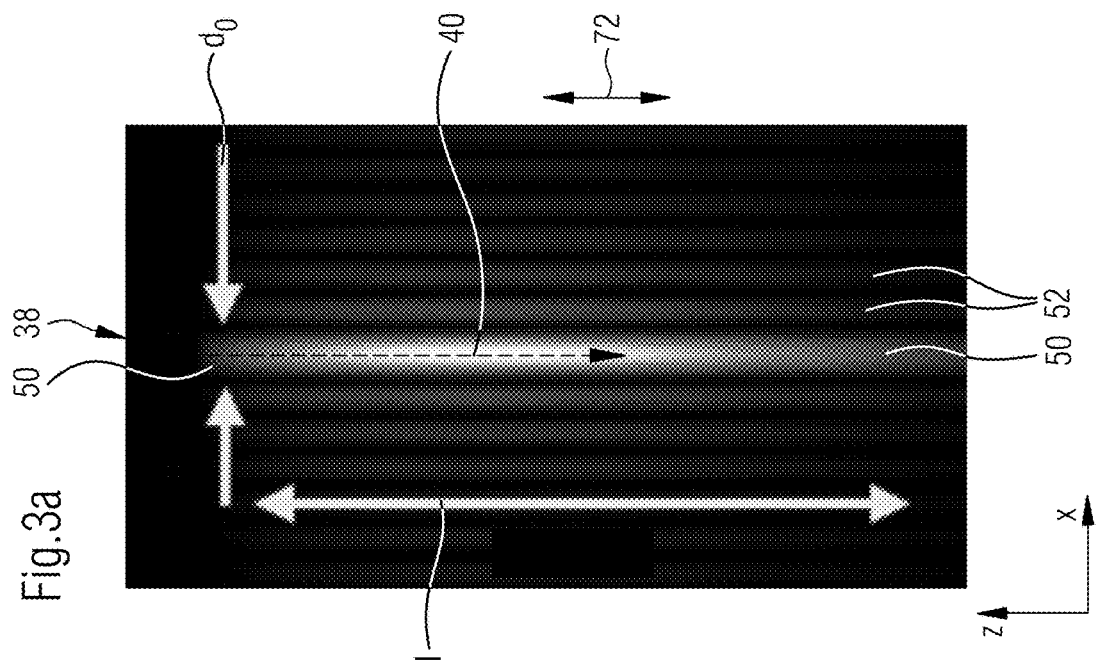
FIG. 3a shows a cross-sectional illustration of a simulated intensity distribution of an example of a first focal zone in an xz-plane oriented parallel to a main direction of extent of the first focal zone.

An example of the first focal zone 38 is shown in FIGS. 3a and 3b, with FIG. 3a illustrating an intensity distribution in an xz-plane oriented parallel to the first main direction of extent 40. In the grayscale value representation shown, brighter grayscale values represent higher intensities.

The first focal zone 38 should in particular be understood to mean a global maximum intensity distribution 50, which in particular has a spatially contiguous form. In particular, only this global maximum intensity distribution 50 is relevant to an interaction with the material 12 to be machined of the workpiece 14.

By way of example, the maximum intensity distribution 50 is surrounded by secondary intensity distributions 52, which occur during the practical realization of the first focal zone 38. These secondary intensity distributions 52 are in particular disposed around the maximum intensity distribution 50 and/or spaced apart from the maximum intensity distribution 50. The secondary intensity distributions 52 are or comprise secondary maxima, for example.

The secondary intensity distributions 52 are insignificant for laser machining the workpiece 14, since owing to the lower intensities there is no and/or negligibly small interaction with the material 12 of the workpiece 14. In particular, no material modifications suitable for machining and in particular separating the material 12 can be formed by means of the secondary intensity distributions 52.

FIG. 3b shows a cross section of the first focal zone 38, shown in FIG. 3a, in an xy-plane oriented perpendicular to the first main direction of extent 40. In the example shown, the first focal zone 38 has a symmetrical cross section. In particular, a diameter $d_0$ of the first focal zone 38 is the same in any direction located in the xy-plane. By way of example, the first focal zone 38 has a circular embodiment in a cross section oriented perpendicular to the first main direction of extent 40.

Figure 4B:
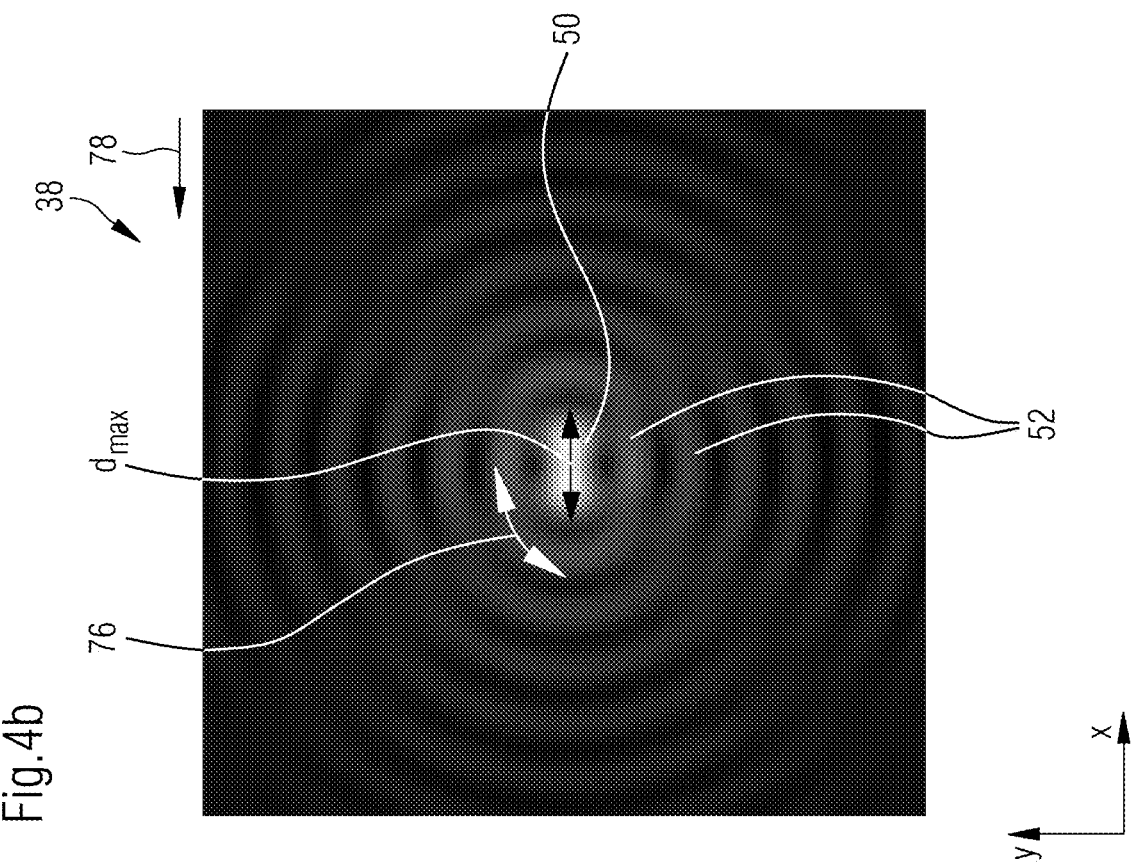
FIG. 4b shows a cross-sectional illustration of the intensity distribution of the focal zone in accordance with FIG. 4a in an xy-plane oriented perpendicular to the main direction of extent.
Figure 4A:
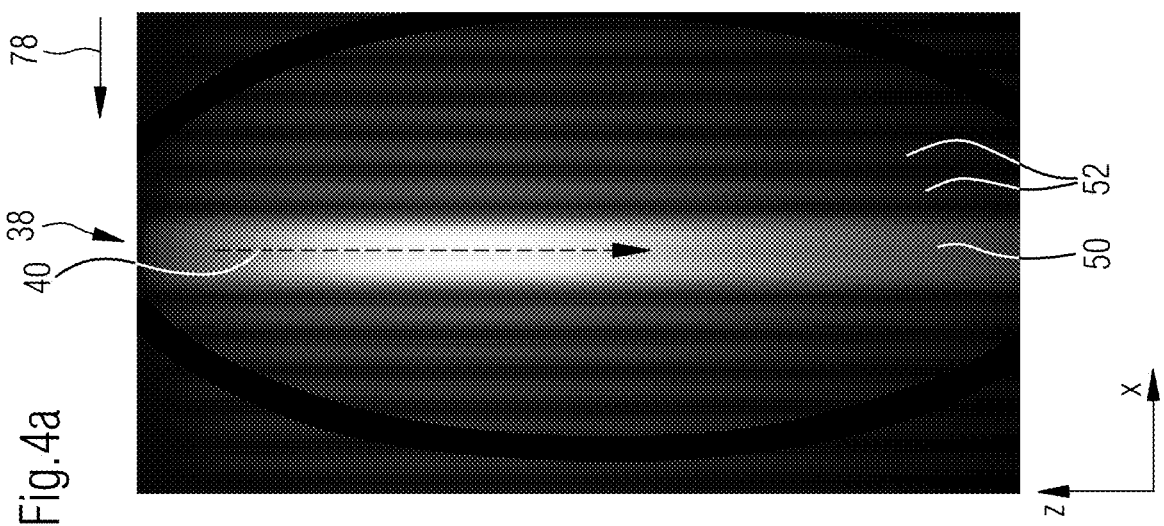
FIG. 4a shows a cross-sectional illustration of a simulated intensity distribution of a further example of a first focal zone in an xz-plane oriented parallel to a main direction of extent of the first focal zone.

Alternatively, provision can be made for the first focal zone 38 created by means of the first laser machining unit 20 to have an asymmetrical cross section in the xy-plane (FIGS. 4a and 4b).

To this end, the first focal zone 38 is for example formed by means of two parallel quasi-nondiffractive and/or Bessel-like beams (FIG. 4A). The two beams are aligned relative to one another in such a way that they at least partly overlap, and a spatially contiguous focal zone is formed as a result.

In the example according to FIGS. 4a and 4b, the first focal zone 38 should be understood to mean the maximum intensity distribution 50, in a manner analogous to the example explained in relation to FIGS. 3a and 3b. The secondary intensity distributions 52 are negligible in relation to an interaction with the material 12 of the workpiece 14.

In the example in accordance with FIGS. 4a and 4b, the first focal zone 38 has an asymmetric cross section in the xy-plane oriented perpendicular to the first main direction of extent 40, that is to say in particular that a numerical value of a diameter of the first focal zone 38 differs for different directions located in the xy-plane and/or is not the same for every direction located in the xy-plane.

In the example shown in FIG. 4b, the first focal zone 38 has a largest diameter $d_{max}$, which for example is oriented parallel to the length direction x.

A length l of the first focal zone 38 is for example of the order of micrometers, for example 300 µm to 2000 µm. In the example shown, this length l is oriented parallel to the first main direction of extent 40.

The diameter $d_0$ or the maximum diameter $d_{max}$ is for example of the order of micrometers.

The second laser machining unit 22 is used to image the second component beam 28 into a second focal zone 54 and a third focal zone 56 (FIGS. 5a, 5b, and 5c). In particular, the second focal zone 54 and the third focal zone 56 are formed by forming appropriate 3-D focal distributions by means of the second laser machining unit 22.

The second focal zone 54 has a second main direction of extent 58 and the third focal zone 56 has a third main direction of extent 60. The second focal zone 54 extends parallel to the second main direction of extent 58 and the third focal zone 56 extends parallel to the third main direction of extent 60.

The second main direction of extent 58 and the third main direction of extent 60 are each oriented transversely to the first main direction of extent 40.

In particular, a respective orientation and/or respective angle between the second main direction of extent 58 and the first main direction of extent 40, and between the third main direction of extent 60 and the first main direction of extent 40, are settable.

By way of example, the second main direction of extent 58 and the third main direction of extent 60 each include a smallest angle α of approx. 25° with the first main direction of extent 40.

In particular, the second focal zone 54 and the third focal zone 56 are each formed by a plurality of component beams which are focused in mutually adjacent partial regions 62 of the second focal zone 54 and the third focal zone 56, respectively.

In particular, mutually adjacent partial regions 62, into which the component beams are focused, are arranged spatially so closely to one another that a spatially contiguous region arises in respect of an interaction with the material 12 of the workpiece 14. In particular, a respective spatially contiguous region of material modifications in the material 12 of the workpiece 14 can be formed by means of the second focal zone 54 and the third focal zone 56 as a result, and so said material is separable in this contiguous region, after the laser machining has been carried out.

By way of example, to form the second focal zone 54 and the third focal zone 56, the second component beam 28 input coupled into the second laser machining unit 22 is split into a plurality of further component beams by means of the second laser machining unit 22 and is focused into the partial regions 62 of the second focal zone 54 and the third focal zone 56, respectively.

In particular, respective focal points are formed in the partial regions 62 by focusing the further component beams into these partial regions 62. In particular, focusing the further component beams into the partial regions 62 causes a luminous intensity there to be so high that there is a relevant interaction with the material 12 of the workpiece 14 in these partial regions 62.

In particular, the partial regions 62 are located on a straight line which is oriented parallel to the second main direction of extent 58 and to the third main direction of extent 60, respectively.

In an embodiment, the second component beam 28 input coupled into the second laser machining unit 22 is split by means of the second laser machining unit 22 into a plurality of further component beams which each have different polarization states. In particular, component beams with respectively different polarization states are then focused into adjacent partial regions 62 of the second focal zone 54 and the third focal zone 56, respectively.

In respect of the technical implementation of the second focal zone 54 and/or the third focal zone 56 by forming component beams with different polarization states, reference is made to the German patent application with the file reference DE 10 2019 217 577.5 (filing date: Nov. 14, 2019) by the same applicant, which is not a prior publication. Express reference to the entire content thereof is made.

In principle, there are different options with regards to the technical implementation of the second focal zone 54 and/or the third focal zone 56 by focusing component beams into different partial regions 62. By way of example, different technical options are described in the scientific prior publication: "Structured light for ultrafast laser micro- and nano-processing" by D. Flamm et al., arXiv:2012.10119v1 [physics.optics], Dec. 18, 2020. Express reference to the entire content thereof is made.

By way of example, the second focal zone 54 has a length $l_2$ of the order of micrometers, for example a length $l_2$ from 100 μm to 400 μm. By way of example, the third focal zone 56 has a length $l_3$ of the order of micrometers, for example a length $l_3$ from 100 μm to 400 μm.

By way of example, the workpiece 14 has a first outer side 64 and a second outer side 66 spaced apart from the first outer side 64 parallel to the depth direction z.

In the example shown, the first laser machining unit 20 and the second laser machining unit 22 are each arranged facing the first outer side 64. By way of example, the first focal zone 38, the second focal zone 54, and the third focal zone 56 can be input coupled into the workpiece 14 from the same direction and/or through the same outer side of the workpiece 14 as a result.

The first laser machining unit 20 and the second laser machining unit 22 are spaced apart from one another at a work distance A, with a distance direction being oriented parallel to the length direction x and/or to the width direction y. Accordingly, in the exemplary embodiment according to FIG. 1, the first focal zone 38 is spaced apart from the second focal zone 54 and from the third focal zone 56 at the work distance A.

To set the work distance A, the apparatus 10 comprises a setting device 68 in particular. Using this setting device 68 it is possible, in particular, to fixedly set and/or define the work distance A during the work operation of the apparatus 10.

In particular, respective work distances A between the first focal zone 38, the second focal zone 54, and the third focal zone 56 are adjustable by means of the setting device 68, in each case both in the length direction x and in the width direction y.

Further, provision can be made for the apparatus 10 to comprise a setting device 70 by means of which a respective work position 72 (indicated in FIGS. 3a and 5a) of the first focal zone 38 and/or second focal zone 54 and/or third focal zone 56 is settable in relation to the depth direction z.

In particular, the first focal zone 38 and/or the second focal zone 54 and/or the third focal zone 56 are displaceable relative to one another in relation to the depth direction z by means of the setting device 70.

Further, provision can be made for the apparatus 10 to comprise a setting device 74, by means of which an alignment 76 and/or an orientation (indicated in FIG. 4b) of the greatest diameter $d_{max}$ is settable in the machining plane 42 in the case of an asymmetric cross section of the first focal zone 38.

The first laser machining unit 20 and the second laser machining unit 22 are each movable relative to the workpiece 14 parallel to an advancement direction 78, in particular a common advancement direction, with this advancement direction 78 being oriented parallel to the machining plane 42.

The first laser machining unit 20 and the second laser machining unit 22 are control-coupled and/or mechanically coupled to one another in such a way that these are moved relative to the workpiece in the common advancement direction 78 during the work operation of the apparatus 10, with in particular the work distance A between the first laser machining unit 20 and the second laser machining unit 22 remaining constant during the work operation of the apparatus 10.

By way of example, the apparatus 10 comprises a holding device 79, at which the first laser machining unit 20 and the second laser machining unit 22 are arranged. By way of example, a movement of the holding device 79 in the advancement direction 78 leads to a corresponding movement of the first laser machining unit 20 and the second laser machine unit 22 in the advancement direction.

In particular the first laser machining unit 20 and the second laser machining unit 22 each have a housing 81, by means of which the first laser machining unit 20 and the second laser machining unit 22 are respectively arranged on and/or fastened to the holding device 79.

Further, a movement of the first laser machining unit 20 in a specific advancement direction 78 brings about a corresponding movement of the assigned first focal zone 38 in this advancement direction 78 relative to the workpiece 14.

Accordingly, a movement of the second laser machining unit 22 in a specific advancement direction 78 brings about a corresponding movement of the assigned second focal zone 54 and third focal zone 56 in this advancement direction 78 relative to the workpiece 14.

In particular, provision can be made for the alignment 76 of the largest diameter $d_{max}$ to be aligned parallel to the advancement direction 78, in particular automatically aligned parallel to the advancement direction 78, by means of the setting device 74 during the work operation of the apparatus 10.

Further, provision can be made for the apparatus 10 to have a setting device 80, by means of which the second focal zone 54 and the third focal zone 56 are each rotatable about an axis of rotation 82 oriented perpendicular to the machining plane 42. This axis of rotation 82 is not necessarily arranged symmetrically with respect to an extent of the second focal zone 54 or the third focal zone 56, but for example assigned to a respective start point 84 or an end point 86 of the second focal zone 54 or the third focal zone 56 (indicated in FIG. 5a).

In principle, it is also possible for the axis of rotation 82 to be oriented transversely or parallel to the machining plane 42.

By means of the setting device 80, it is possible during the work operation of the apparatus 10 to set an alignment 88 and/or orientation assigned to the axis of rotation 82 of the second focal zone 54 and of the third focal zone 56. In particular, the second focal zone 54 and the third focal zone 56 are aligned, in particular automatically aligned, at a fixed angle β with respect to the advancement direction (FIG. 8) during the work operation of the apparatus 10.

In particular, the angle β chosen by means of the setting device 80 is 90° during the work operation of the apparatus 10.

The first focal zone 38, the second focal zone 54, and the third focal zone 56 need not necessarily have a straight-line shape. In principle, it is also possible for the first focal zone 38 and/or the second focal zone 54 and/or the third focal zone 56 to have a curved shape and/or to have a curved longitudinal central axis (indicated in FIG. 11).

In terms of the formation and properties of quasi-nondiffractive and/or Bessel-like beams with curved shapes, reference is made to the scientific publication "Bessel-like optical beams with arbitrary trajectories" by I. Chremmos et al., Optics Letters, vol. 37, no. 23, Dec. 1, 2012.

By way of example, the respective main direction of extent 40, 58, 60 of the focal zone 38, 54, 56 should be understood to mean the direction of a straight line which runs through the start point 84 and the end point 86 of the assigned focal zone 38, 54, 56.

Figure 2:
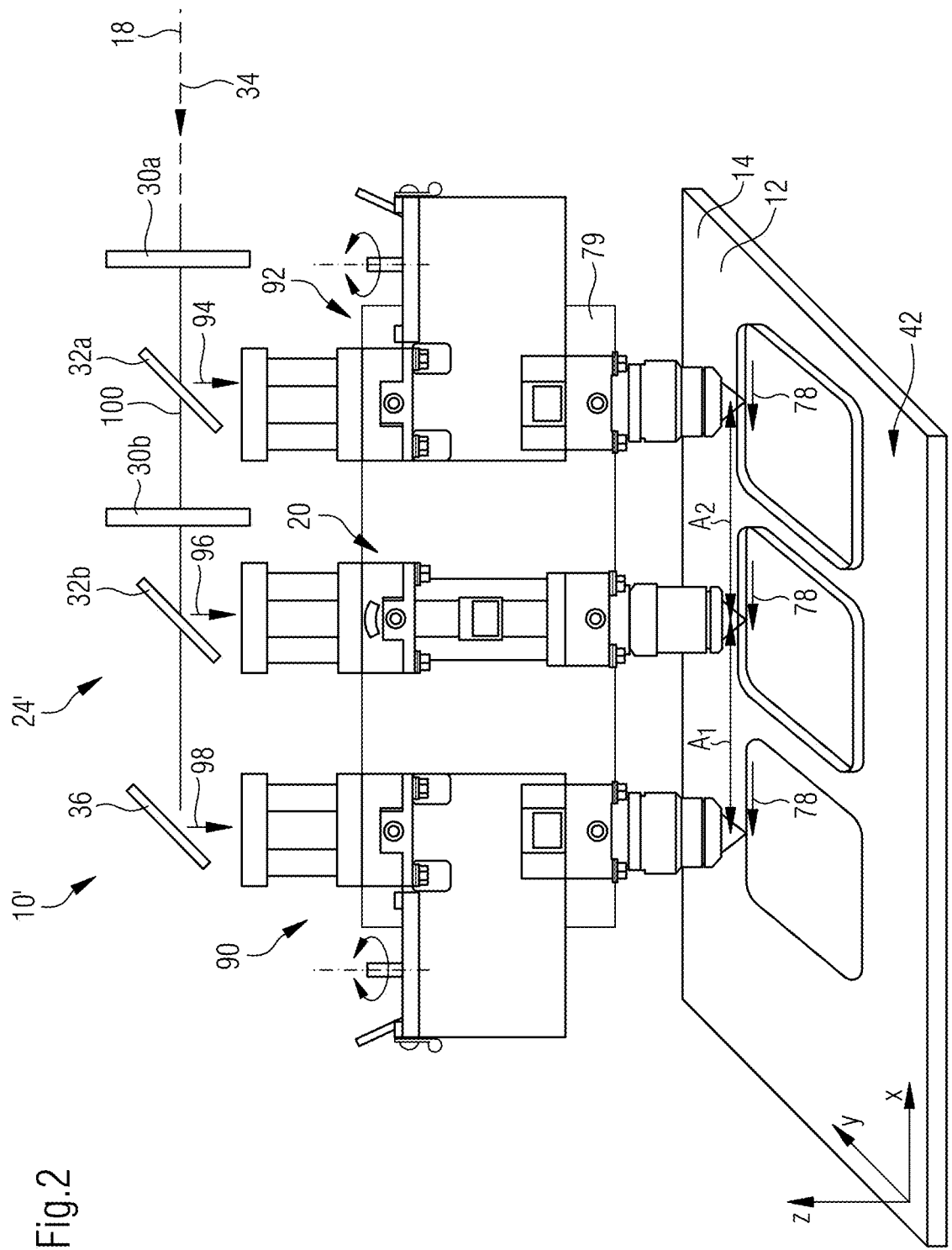
FIG. 2 shows a further exemplary embodiment of an apparatus for laser machining a workpiece, having a first laser machining unit, a second laser machining unit, and a third laser machining unit.

A further embodiment of an apparatus 10' shown in FIG. 2 differs from the above-described embodiment of the apparatus 10 in accordance with FIG. 1 substantially in that the second focal zone 54 and the third focal zone 56 are in particular not formed by means of a single laser machining unit, but a separate laser machining unit is provided instead in each case for the formation of the second focal zone 54 and the third focal zone 56.

In particular, the apparatus 10' has one or more features and/or advantages of the above-described apparatus 10.

The apparatus 10' comprises the first laser machining unit 20, which is configured to form the first focal zone 38.

Further, the apparatus 10' comprises a second laser machining unit 90 and a third laser machining unit 92. In particular, the second laser machining unit 90 and the third laser machining unit 92 in particular have the same design and/or in particular have the same functionality as the above-described second laser machining unit 22, with the result that the above description is referred to in this respect. In particular, the second laser machining unit 90 and the third laser machining unit 92 have one or more features and/or advantages of the above-described second laser machining unit 22.

The second focal zone 54 is formed by means of the second laser machining unit 90 and the third focal zone 56 is formed by means of the third laser machining unit 92.

In the embodiment in accordance with FIG. 2, the second laser machining unit 90 is spaced apart from the first laser machining unit 20 at a first work distance $A_1$ and the third laser machining unit 92 is spaced apart from the first laser machining unit 20 at a second work distance $A_2$, with a respective distance direction of the work distance $A_1$ and of the work distance $A_2$ being oriented parallel to the machining plane 42.

Accordingly, the second focal zone 54 created by means of the second laser machining unit 90 is spaced apart at the work distance $A_1$ from the first focal zone 38 created by means of the first laser machining unit 20 and the third focal zone 56 created by means of the third laser machining unit 92 is spaced apart from the first focal zone 38 at the work distance $A_2$.

In the example shown, the first laser machining unit 20 or the first focal zone 38 is arranged between the second laser machining unit 90 or the second focal zone 54 and the third laser machining unit 92 or the third focal zone 56, in relation to the length direction x and/or the width direction y. In principle, it is also possible for the laser machining units 20, 90, 92 or the focal zones 38, 54, 56 to be positioned in any other desired order in relation to the length direction x and/or the width direction y.

The first laser machining unit 20, the second laser machining unit 90, and the third laser machining unit 92 are arranged on the holding device 79 and are movable relative to the workpiece 14 parallel to the common advancement direction 78 by means of the holding device 79. Accordingly, the first focal zone 38, the second focal zone 54, and the third focal zone 56 are movable relative to the workpiece 14 parallel to the common advancement direction 78.

The apparatus 10' comprises an input coupling device 24' which in principle has the same functionality as the above-described input coupling device 24, with the result that reference is made to the above description thereof in this respect. In particular, the input coupling device 24' has one or more features and/or advantages of the above-described input coupling device 24.

In the example shown, the input coupling device 24' is used to split, in particular by means of polarization beam splitting, the input laser beam 18 into a first component beam 94 for input coupling into the third laser machining unit 92, into a second component beam 96 for input coupling into the first laser machining unit 20, and into a third component beam 98 for input coupling into the second laser machining unit 90.

By way of example, the input coupling device 24' comprises a first polarization element 30a and a second polarization element 30b, arranged downstream of the first polarization element 30a in the beam propagation direction 34.

In respect of the beam propagation direction 34, a first polarization beam splitting element 32a for splitting the input laser beam 18 into the first component beam 94 and into a transmitted beam 100 is arranged between the first polarization element 30a and the second polarization element 30b.

This transmitted beam 100 is incident on the second polarization element 30b and is subsequently split into the second component beam 96 and the third component beam 98 by means of a second polarization beam splitting element 32b.

An intensity ratio and/or power ratio of the first component beam 94, second component beam 96, and third component beam 98 can be set by means of the first polarization beam splitting element 32a and the second polarization beam splitting element 32b.

In principle, it would also be possible to input couple a respective laser beam from a respectively different laser source into the first laser machining unit 20, the second laser machining unit 90, and the third laser machining unit 92.

Figure 6:
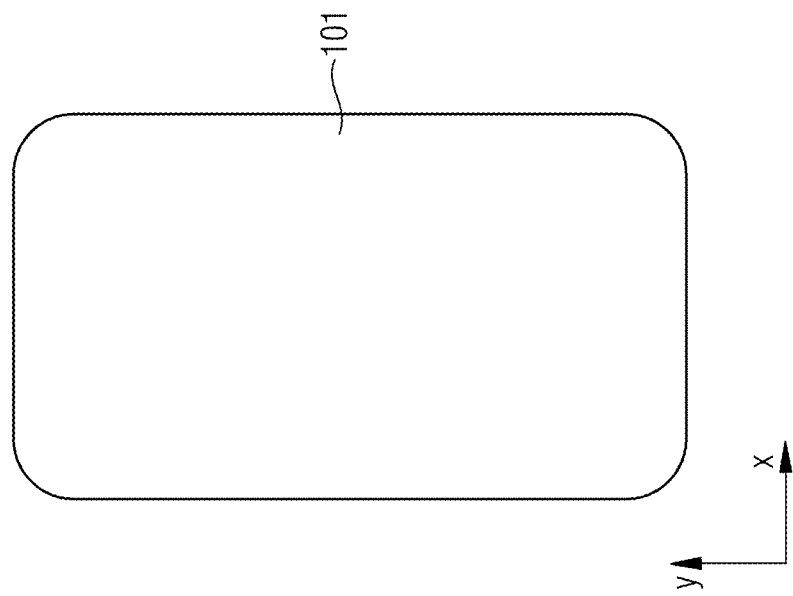
FIG. 6 shows a schematic cross-sectional illustration of a workpiece segment, machined by means of the apparatus and subsequently separated, in an xy-plane oriented parallel to the width direction and length direction of the workpiece.

The apparatus 10 operates as follows:

By laser machining the workpiece 14 by means of the apparatus 10, it is possible for example to separate one or more workpiece segments 101 (FIG. 6) from the workpiece 14.

To this end, the material 12 of the workpiece 14 is exposed to the first focal zone 38, the second focal zone 54, and the third focal zone 56.

By way of example, the second focal zone 54 and the third focal zone 56 are arranged and formed by means of the second laser machining unit 22 in such a way that the second focal zone 54 is arranged spaced apart from the third focal zone 56 in the depth direction z and/or that the second focal zone 54 and the third focal zone 56 are arranged at the same positions in relation to the length direction x and/or the width direction y.

The first laser machining unit 20 is used to arrange and form the first focal zone 38 in such a way that the latter extends between the second focal zone 54 and the third focal zone 56, in particular fully extends between the second focal zone 54 and the third focal zone 56, in relation to the depth direction z. In this case, the first focal zone 38 is spaced apart from the second focal zone 54 and the third focal zone 56 at the work distance A. In the case of the situation shown in FIG. 1, this work distance A is for example oriented parallel to the advancement direction 78.

In particular, in relation to the depth direction z, the third focal zone 56 extends within the material 12 between the second outer side 66 of the workpiece 14 and the first focal zone 38. In particular, in relation to the depth direction z, the second focal zone 54 extends between the first focal zone 38 and the first outer side 64.

By way of example, respective positions of the first focal zone 38, the second focal zone 54, and the third focal zone 56 in the depth direction can be set by means of the setting device 70.

In particular, the first focal zone 38, the second focal zone 54, and the third focal zone 56 for machining the workpiece 14 extend in a common plane, which is oriented perpendicular to the machining plane 42 in particular. By way of example, this can be realized by way of an appropriate adjustment by means of the setting devices 68 and 80.

Figure 8:
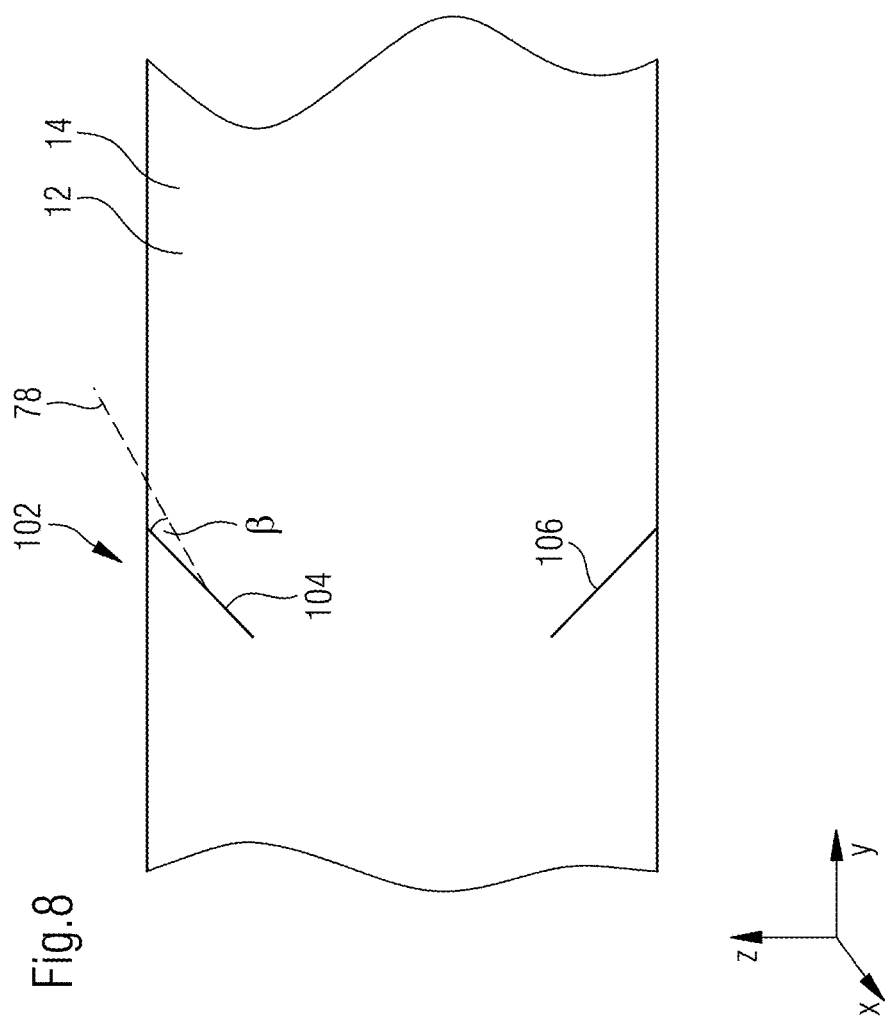
FIG. 8 shows a schematic cross-sectional illustration of a portion of a workpiece in the yz-plane, which is modified by exposure by a second and a third focal zone.

By exposing the workpiece 14 to the second focal zone 54 and the third focal zone 56 at a specific machining point 102, appropriate material modifications are created at this machining point 102 in the material 12 of the workpiece 14 (FIG. 8).

The material modifications created at the machining point 102 by means of the second focal zone 54 are arranged along a second machining line 104. Accordingly, material modifications are formed along a third machining line 106 at the machining point 102 by means of the third focal zone 56.

As a result of relative movement of the second focal zone 54 and the third focal zone 56 in relation to the material 12, material modifications are formed along a respective machining surface and/or machining plane, which for example is oriented parallel to the second machining line 104 and advancement direction 78, or parallel to the third machining line 106 and advancement direction 78.

Figure 9:
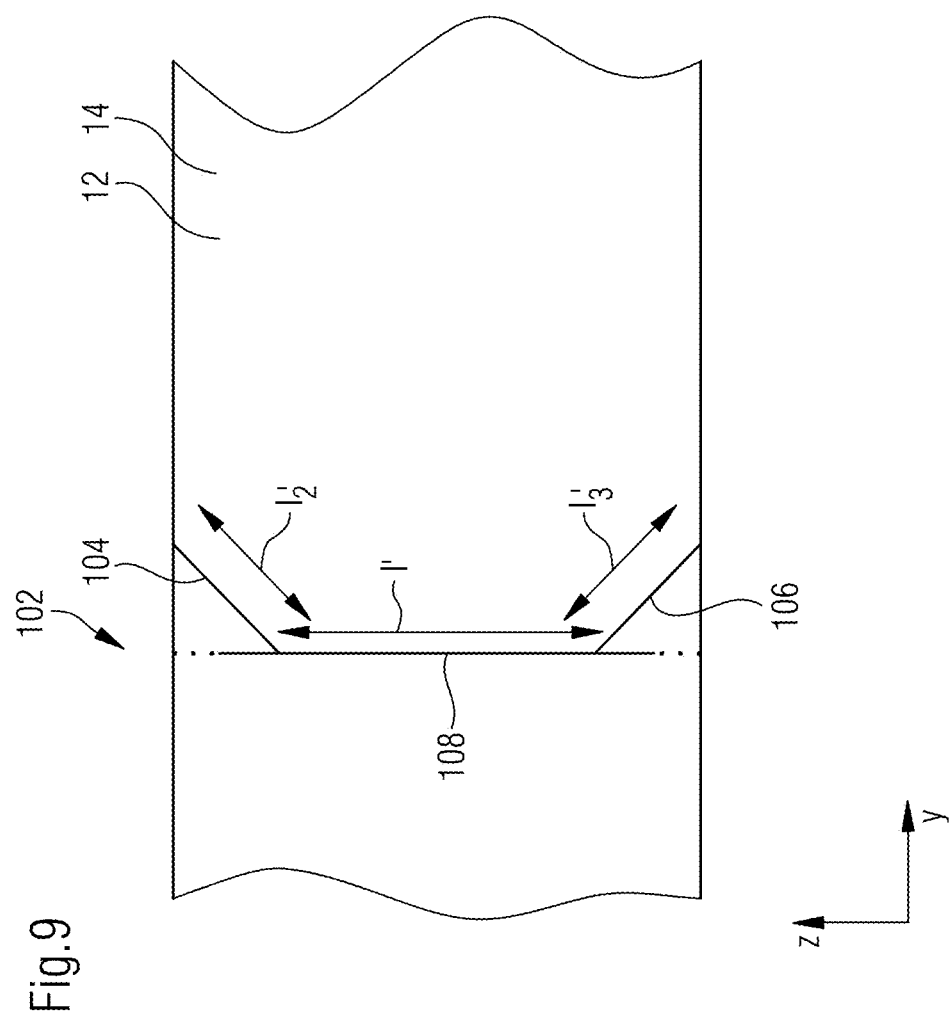
FIG. 9 shows a schematic cross-sectional illustration of a portion of a workpiece in the yz-plane, which is modified by a first focal zone at a machining point already modified by the second and third focal zone.

The first focal zone 38 strikes the considered machining point 102 of the workpiece 14 temporally after the second focal zone 54 or the third focal zone 56 (FIG. 9), with a temporal spacing for example corresponding to a quotient of work distance and advancement speed (in the case of a constant advancement speed and advancement direction).

At the machining point 102, material modifications are created along a first machining line 108 in the material 12 as a result of exposing the material 12 to the first focal zone 38, with the relative movement of the first focal zone 38 with respect to the material 12 leading to the formation of material modifications along a corresponding machining surface and/or machining plane, which for example is oriented parallel to the first machining line 108 and advancement direction 78.

A respective length and/or shape of the first machining line 108 or second machining line 104 or third machining line 106 corresponds in particular to a respective length and/or shape of the first focal zone 38 or second focal zone 54 or third focal zone 56 when the workpiece 14 is exposed within the material 12.

The first machining line 108 has a length 1' corresponding to the first focal zone 38, the second machining line 104 has a length 1' 2 corresponding to the second focal zone 54, and the third machining line 106 has a length 1' 3 corresponding to the third focal zone 56.

By way of example, laser machining the workpiece 14 is implemented by means of the apparatus 10 along given machining contours 110, with the machining contours 110 for example being closed contours. As a result, respective material modifications at which the material 12 is separable are formed in the material 12 along the machining surfaces assigned to the machining lines 104, 106, 108.

As a result, it is for example possible to separate workpiece segments 101 from the workpiece 14 and/or out of the workpiece 14. For example, a separation of a workpiece segment 101 is implemented by thermal loading and/or by exerting mechanical stress and/or by etching by means of at least one wet-chemical solution, for example in the ultrasound-assisted etch bath.

Figure 7:
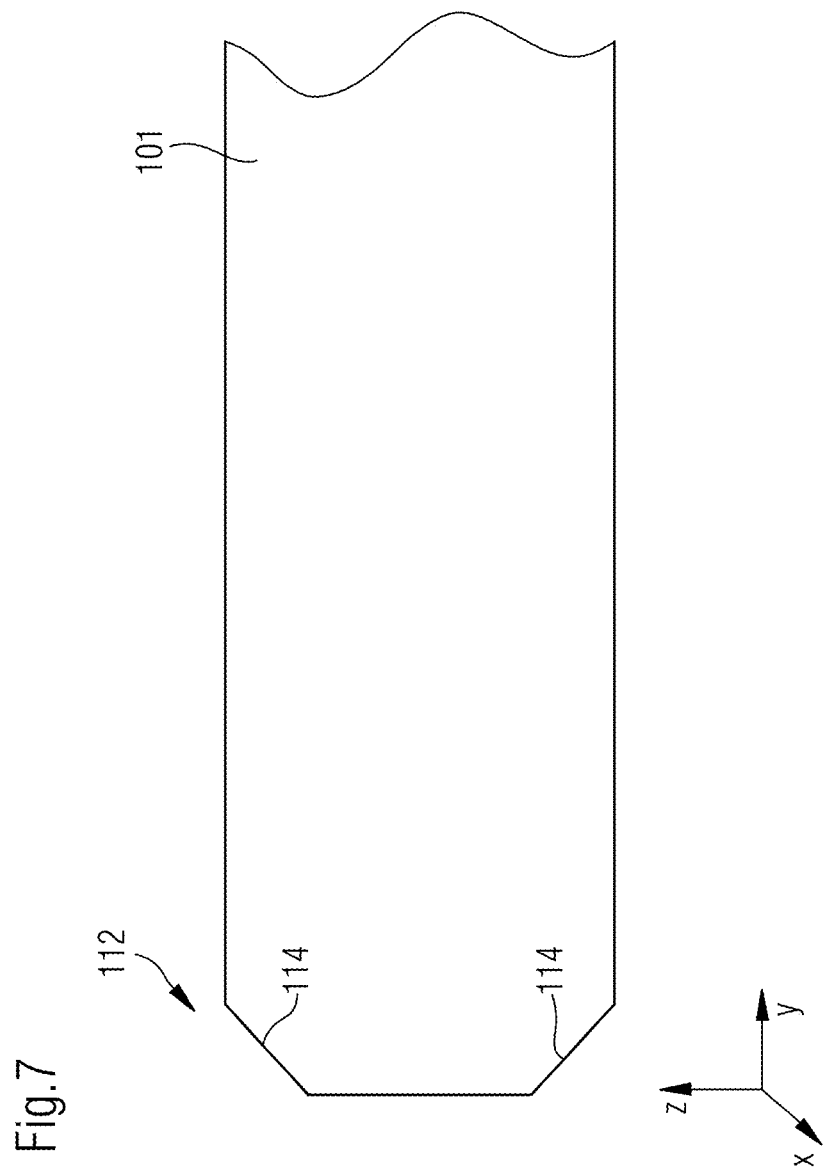
FIG. 7 shows a schematic cross-sectional illustration of the workpiece segment in accordance with FIG. 6 in a yz-plane oriented parallel to the depth direction of the workpiece.

A geometry of the workpiece segment 101 in a separation region 112 and/or edge region (FIG. 7) corresponds to a geometry of the first focal zone 38, the second focal zone 54, and the third focal zone 56, to which the workpiece 14 is exposed previously. In particular, the workpiece segment 101 has angled edges 114 (a chamfer) in the separation region 112, which were created by means of the second focal zone 54 and the third focal zone 56.

Figure 11:
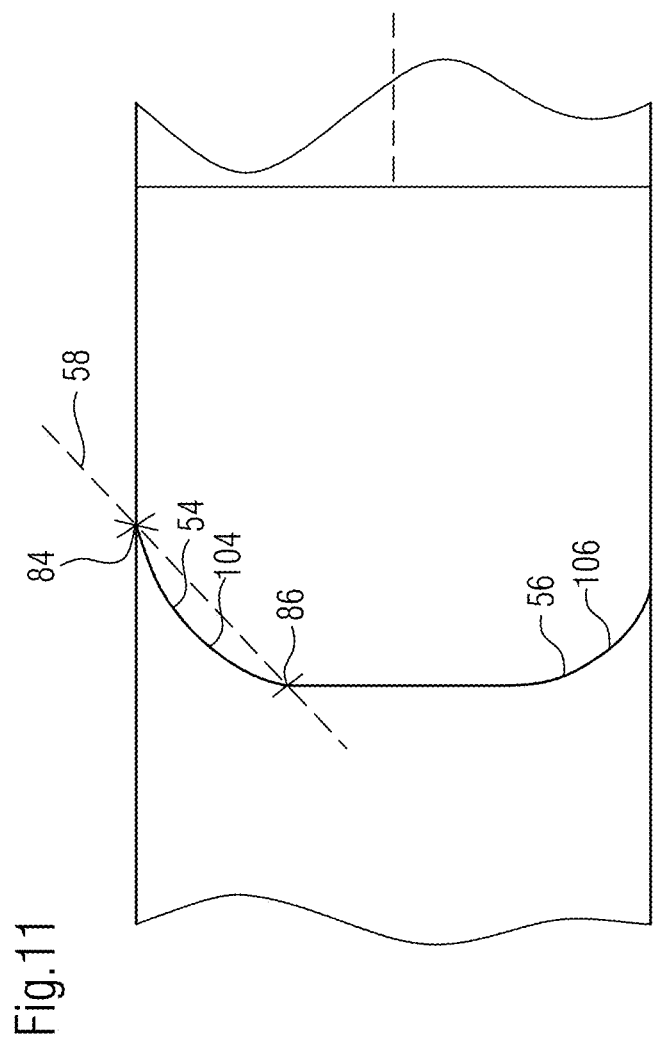
FIG. 11 shows a schematic cross-sectional illustration of a portion of a workpiece in the yz-plane, at which material modifications are formed along

For example, if the second focal zone 54 and/or the third focal zone 56 have a curved shape, then the assigned second machining line 104 and third machining line 106 also have a correspondingly curved shape (FIG. 11). By way of example, rounded-off edges can be formed in the separation region 112 as a result.

By setting the respective work distance A in the length direction x and in the width direction y between the first focal zone 38, the second focal zone 54, and the third focal zone 56 by means of the setting device 68, it is possible to define the corresponding lengths l, $l_2$, and $l_3$ or l, $l'_2$, and $l'_3$. In particular, edge lengths can be defined in the separation region 112 as a result.

If the first focal zone 38 created by means of the first laser machining unit 20 has an asymmetric cross section (FIGS. 4a and 4b), then the alignment 76 of the largest diameter d max is aligned parallel to the advancement direction 78 in particular by means of the setting device 74. This leads to the formation of cracks in the material 12 which are aligned at least approximately parallel to the advancement direction 74 and/or the corresponding machining plane, in particular allowing an improved material separation.

The use of a first focal zone 38 with an asymmetric cross section and the setting of the alignment 76 parallel to the preferred direction 78 is relevant, in particular, if, like in the case of the above-described example, the machining point 102 is exposed to the first focal zone 38 after it had already been exposed to the second focal zone 54.

Figure 10:
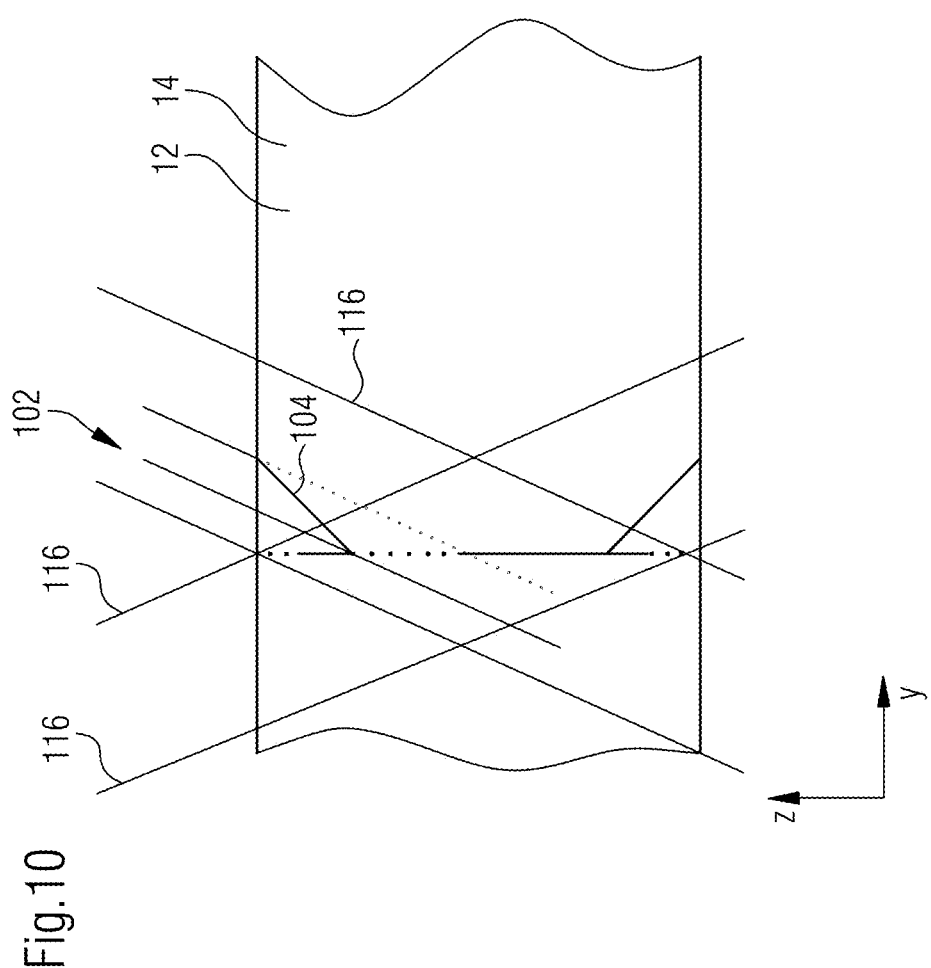
FIG. 10 shows a schematic cross-sectional illustration of the portion of the workpiece in accordance with FIG. 9, with a beam path of component beams for the formation of the first focal zone being shown.

On account of the second machining line 104 already formed at the machining point 102, there are shielding effects in relation to component beams 116 used to form the first focal zone 38 (indicated in FIG. 10). In the case of a symmetrical cross section of the first focal zone 38, this may interfere with a crack formation in the material 12 and for example interfere to such an extent that cracks are formed at different angles with respect to the preferred direction 78 and/or are not formed as desired substantially parallel to the advancement direction 78. By using a first focal zone 38 with an asymmetric cross section and by setting the alignment 76 parallel to the advancement direction 78, it is possible even in this situation to control a crack formation in such a way that cracks are formed substantially parallel to the advancement direction 78.

In principle, the apparatus 10' shown in FIG. 2 has the same functionality as the apparatus 10.

In the case of the apparatus 10', the second focal zone 54 is spaced apart from the first focal zone 38 at the work distance $A_1$ and the third focal zone 56 is spaced apart from the first focal zone 38 at the work distance $A_2$ in the case of the exemplary embodiment in accordance with FIG. 2, with the first focal zone 38 being arranged between the second focal zone 54 and the third focal zone 56.

Accordingly, in the example shown, the material modification at a specific machining point 102 of the workpiece 14 is initially formed in time along the second machining line 104, subsequently along the first machining line 108, and then along the third machining line 106.

In principle, the sequence of creating the first machining line 108, the second machining line 104, and the third machining line 106 can be implemented in any other order. To this end, the apparatuses 10, 10' can be accordingly adjusted and/or set if necessary.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

A Work distance
$A_1$ First work distance
$A_2$ Second work distance
$\alpha$ Angle
$\beta$ Angle
$d_0$ Diameter
$d_{max}$ Largest diameter
l Length
$l_2$ Length
$l_3$ Length
l' Length
$l'_2$ Length
$l'_3$ Length
x Length direction
y Width direction
z Depth direction
10, 10' Apparatus
12 Material
14 Workpiece
16 Laser source
18 Input laser beam
20 First laser machining unit
22 Second laser machining unit
24, 24' Input coupling device
26 First component beam
28 Second component beam
30 Polarization element
30a First polarization element
30b Second polarization element
32 Polarization beam splitting element
32a First polarization beam splitting element
32b Second polarization beam splitting element
34 Beam propagation direction
36 Mirror element
38 First focal zone
40 First main direction of extent
42 Machining plane
50 Maximum intensity distribution
52 Secondary intensity distribution
54 Second focal zone
56 Third focal zone
58 Second main direction of extent
60 Third main direction of extent
62 Partial region
64 First outer side
66 Second outer side
68 Setting device
70 Setting device
72 Work position
74 Setting device
76 Alignment
78 Advancement direction
79 Holding device
80 Setting device
81 Housing
82 Axis of rotation
84 Start point
86 End point
88 Alignment
90 Second laser machining unit
92 Third laser machining unit
94 First component beam
96 Second component beam
98 Third component beam
100 Transmitted beam
101 Workpiece segment
102 Machining point
104 Second machining line
106 Third machining line
108 First machining line 110 Machining contour
112 Separation region
114 Edge
116 Component beam

The invention claimed is:

1. An apparatus for laser machining a workpiece in a machining plane, comprising a first laser machining unit for forming a first focal zone which extends in a first main direction of extent, and at least one further laser machining unit for forming at least one further focal zone which extends in a further main direction of extent oriented transversely to the first main direction of extent, the first focal zone and the at least one further focal zone being spaced apart from one another parallel to the machining plane at a work distance, the first laser machining unit with the first focal zone and the at least one further laser machining unit with the at least one further focal zone each being movable in an advancement direction that is oriented parallel to the machining plane, and the workpiece comprising a material that is transparent to a laser beam which respectively forms the first focal zone and the at least one further focal zone.

2. The apparatus as claimed in claim 1, wherein the first laser machining unit and the at least one further laser machining unit are arranged to face a same outer side of the workpiece; and/or wherein the first focal zone and the at least one further focal zone are coupled into the workpiece through the same outer side of the workpiece.

3. The apparatus as claimed in claim 1, wherein:
the first laser machining unit and the at least one further laser machining unit are mechanically coupled to one another in such a way that a movement of the first laser machining unit and the first focal zone and a movement of the at least one further laser machining unit and the at least one further focal zone are implemented in a common advancement direction; and/or
the first laser machining unit and the at least one further laser machining unit are mechanically coupled to one another in such a way that the movement of the first laser machining unit and the first focal zone and the movement of the at least one further laser machining unit and the at least one further focal zone are implemented along machining contours which are oriented parallel to one another and/or with a parallel offset from one another.

4. The apparatus as claimed in claim 1, wherein the further main direction of extent is oriented at an angle of at least 1° and/or at most 89° with respect to the first main direction of extent.

5. The apparatus as claimed in claim 1, further comprising a setting device for setting the work distance, oriented parallel to the machining plane, between the first focal zone and the at least one further focal zone and/or between the first laser machining unit and the at least one further laser machining unit, with the work distance being settable parallel to a length direction parallel to the machining plane and parallel to a width direction parallel to the machining plane.

6. The apparatus as claimed in claim 1, wherein the first focal zone formed by the first laser machining unit has a quasi-nondiffractive and/or Bessel-like beam profile.

7. The apparatus as claimed in claim 1, wherein the first focal zone formed by the first laser machining unit is asymmetrical and in a cross section parallel to the machining plane.

8. The apparatus as claimed in claim 7, further comprising a setting device for rotating an alignment of a largest diameter of the cross section of the first focal zone in the machining plane, and wherein the largest diameter is alignable parallel to the advancement direction by the setting device.

9. The apparatus as claimed in claim 1, wherein the at least one further focal zone formed by the at least one further laser machining unit is formed by splitting the laser beam into a plurality of component beams, with the plurality of component beams being focused in mutually adjacent partial regions of the at least one further focal zone.

10. The apparatus as claimed in claim 1, further comprising a setting device for rotating the first focal zone and/or the at least one further focal zone about an axis of rotation oriented transversely or perpendicular or parallel to the machining plane, and wherein an alignment of the at least one further focal zone at a fixed angle with respect to the advancement direction is settable by the setting device.

11. The apparatus as claimed in claim 1, further comprising an input coupling device for input coupling an input laser beam into the first laser machining unit and into the at least one further laser machining unit, a split of the input laser beam into a first component beam for input coupling into the first laser machining unit and into at least one further component beam for input coupling into the at least one further laser machining unit being implemented by the input coupling device.

12. The apparatus as claimed in claim 1, wherein a second focal zone with a second main direction of extent and a third focal zone with a third main direction of extent are formed by the at least one further laser machining unit, the second main direction of extent and the third main direction of extent each being oriented transversely to the first main direction of extent, and wherein the second focal zone and the third focal zone are arranged spaced apart from one another in relation to a depth direction oriented perpendicular to the machining plane, and/or wherein the first focal zone is arranged between the second focal zone and the third focal zone in relation to the depth direction oriented perpendicular to the machining plane.

13. The apparatus as claimed in claim 12, wherein at least certain portions of the second focal zone and of the third focal zone are arranged at same positions in relation to a length direction and/or a width direction parallel to the machining plane; or wherein the second focal zone and the third focal zone are arranged spaced apart from one another in relation to the length direction and/or the width direction parallel to the machining plane.

14. A method for laser machining a workpiece, the method comprising:
forming, using a first laser machining unit, a first focal zone which extends in a first main direction of extent,
forming, using at least one further laser machining unit, at least one further focal zone which extends in a further main direction of extent oriented transversely to the first main direction of extent, the first focal zone and the at least one further focal zone being spaced apart from one another parallel to the machining plane at a work distance, and
exposing the workpiece to the first focal zone and the at least one further focal zone, the first laser machining unit with the first focal zone and the at least one further laser machining unit with the at least one further focal zone each being moved relative to the workpiece in an advancement direction that is oriented parallel to the machining plane, and the workpiece comprising a material that is transparent to a laser beam which respectively forms the first focal zone and the at least one further focal zone.

15. The method as claimed in claim 14, wherein an exposure of a specific machining point on the workpiece to the first focal zone and to the at least one further focal zone is implemented with a time offset.

* * * * *